United States Patent [19]
Koenhen

[11] Patent Number: 5,456,843
[45] Date of Patent: Oct. 10, 1995

[54] MICROFILTRATION AND/OR ULTRAFILTRATION MEMBRANE, METHOD OF PREPARATION AND METHOD OF FILTRATION BY MEANS OF SUCH A MEMBRANE

[75] Inventor: Dirk M. Koenhen, Dedemsvaart, Netherlands

[73] Assignee: X-Flow B.V., Ah Almelo, Netherlands

[21] Appl. No.: 311,484

[22] Filed: Sep. 23, 1994

[30] Foreign Application Priority Data

Oct. 6, 1993 [NL] Netherlands ............ 9301716

[51] Int. Cl.$^6$ ........................... B01D 61/00
[52] U.S. Cl. ............... 210/651; 210/650; 210/653; 210/654; 210/500.41; 210/500.23; 210/502.1; 210/503; 210/660; 264/41
[58] Field of Search ............... 210/650, 651, 210/652, 653, 654, 655, 500.1, 500.41, 500.23, 502.1, 503, 660; 264/41

[56] References Cited

U.S. PATENT DOCUMENTS

| | | | |
|---|---|---|---|
| 3,862,030 | 1/1975 | Goldberg | 210/490 |
| 4,008,339 | 2/1977 | Matsuda et al. | 426/330.4 |
| 4,276,179 | 6/1981 | Soehngen | 210/679 |
| 4,305,782 | 12/1981 | Ostreiher et al. | 210/505 |
| 4,340,428 | 7/1982 | Böddeker et al. | 264/41 |
| 4,735,193 | 4/1988 | Kulprathipanja et al. | 127/46.3 |
| 4,792,400 | 12/1988 | Dougherty et al. | 210/500.1 |
| 4,925,459 | 5/1990 | Rojey et al. | 155/16 |
| 4,943,374 | 7/1990 | Heinlinger et al. | 210/651 |
| 5,009,824 | 4/1991 | Walch et al. | 210/500.41 |
| 5,141,611 | 8/1992 | Ford | 204/182.4 |
| 5,248,428 | 9/1993 | Hagen et al. | 210/502.1 |
| 5,262,053 | 11/1993 | Meier | 210/636 |

FOREIGN PATENT DOCUMENTS

| | | |
|---|---|---|
| 0351363 | 3/1992 | European Pat. Off. . |
| 0324675 | 1/1993 | European Pat. Off. . |
| 2295771 | 12/1975 | France . |
| WO86/06589 | 11/1986 | WIPO . |

Primary Examiner—Robert A. Dawson
Assistant Examiner—Ana M. Fortuna
Attorney, Agent, or Firm—Wolf, Greenfield & Sacks

[57] ABSTRACT

The invention relates to a microfiltration and/or ultrafiltration membrane consisting of a polymer having nominal pores of 0.001–10 μm. The special feature of the membranes according to the invention is that the matrix of the membrane incorporates an active adsorbent which is preferably polyvinyl pyrrolidone. Usually the polyvinyl polypyrrolidon is present in the membrane in an amount of 5–90% by weight and preferably in an amount of 30–70% by weight. Preferably the membrane is hydrophilic and is usually asymmetric or is constructed of different layers. The nominal pore size of the membrane is 0N05—5 μm and preferably 0.2–1.0 μm, while the membrane is tubular, flat or capillary. Furthermore, the invention relates to a method of preparation of the membrane and to a method of filtration of undissolved components from a liquid and/or the simultaneous adsorption of dissolved components from the liquid by means of the membrane, the method according to the invention is especially suitable for the removal of components causing turbidity from a liquid, especially beer.

20 Claims, No Drawings

MICROFILTRATION AND/OR ULTRAFILTRATION MEMBRANE, METHOD OF PREPARATION AND METHOD OF FILTRATION BY MEANS OF SUCH A MEMBRANE

The invention relates to a microfiltration and/or ultrafiltration membrane, to a method of its preparation and to a method of the filtration of a liquid by means of such a membrane.

Such membranes are known from the prior art, whereby said membranes can, for instance, be used for the filtration of all kinds of liquids containing solid components. These membranes can, for instance be used for the removal of yeast cells causing turbidity from unfiltered beer or for the treatment of unfiltered fruit juices.

However, the disadvantage of such a filter is that when, for example, it is used for the filtration of beer, dissolved components, such as polyphenols, are allowed to pass through, which by reacting with proteins can after a time cause turbidity. Naturally this is not desirable as such turbidity takes away the very essential characteristic of beer, namely clearness.

It is also known that the polyphenols causing such turbidity can be removed from the beer, which is first filtered in order to remove the insoluble components such as yeast etc., by adding polyvinyl polypyrrolidone in powder form. The undesirable polyphenols are adsorbed by polyvinyl polypyrrolidone (PVPP) and the solid PVPP particles are then removed from the beer by filtration.

Traditionally one used kieselguhr filters for the clarification of beer, however, a disadvantage is that they produce much waste. These kieselguhr or diatomaceous earth filters have lately been replaced by cross-flow microfiltration.

Such a membrane is, for instance, described in applicant's U.S. Pat. No. 4,789,847.

It goes without saying that the known method of the removal of polyphenols by addition of powdered PVPP is time-consuming, making the process expensive.

It is the object of the invention to provide a membrane whereby the disadvantages of the known membranes are effectively removed.

To this end the present method provides a microfiltration and/or ultrafiltration membrane consisting of a polymer having nominal pores of 0.001–10 µm, characterized in that the matrix of the membrane incorporates an active adsorbent.

Surprisingly it has been shown that the incorporation of an active adsorbent into the membrane matrix, being preferably polyvinyl polypyrrolidone, provides a membrane capable of selectively adsorbing dissolved components from the liquid. This makes especially polyvinyl polypyrrolidonee a particularly suitable adsorbent for the removal of polyphenols from beer or other liquids.

Good results have been obtained when the active adsorbent, in particular the polyvinyl polypyrrolidone is present in the membrane in an amount of 5–90% by weight, and preferably in an amount of 30–70% by weight.

Apart from PVPP other active adsorbents may be incorporated in the membrane matrix provided that the membrane matrix can be subjected to regeneration. The membrane structure must be resistant to the regeneration fluid, in other words, the membrane structure must stay intact under the influence of the regeneration solution applied.

For the application in the pharmaceutical industry, for removing the bitter taste from fruit juices etc. membrane ion exchangers can be incorporated. Such a membrane is, for instance, particularly suitable for the removal of the dissolved components causing the bitter taste of fruit juices.

When using the membrane according to the invention for the filtration of aqueous solutions, a hydrophilic membrane matrix is preferred.

The membrane according to the invention is preferably asymmetric, but may also be composed of different layers.

By means of a spinning head having, for instance four concentric circular openings, a membrane can be obtained of a so-called sandwich structure. The layers in direct contact with the liquids may determine the pore size and prevent at the same time loss of adsorbent. The central layer may contain a large amount of adsorbent. As a rule the nominal pore size of the membrane is 0.05–5 µm and preferably 0.2–1.0 µm.

The membrane according to the invention may be tubular, flat or capillary.

The invention relates further to a method of manufacturing the membrane according to the invention as described above, characterized in that a polymer solution/suspension is prepared, starting with the polymers polysulphone or polyether sulphone and polyvinyl pyrrolidone and a suitable solvent mixture in which the active adsorbent polyvinyl pyrrolidone is suspended, after which the mixture is processed into a membrane.

When manufacturing the membrane one usually adds extra PVPP powder to the casting solution formulation.

When manufacturing the membrane according to the invention one generally uses 5–20 parts by weight of polyether sulphone, 1–10 parts by weight of polyvinyl pyrrolidone, 5–30 parts by weight of polyvinyl polypyrrolidone and 0–15 parts by weight of glycerine in N-methyl pyrrolidone.

Furthermore, the invention relates to a method of separating undissolved components from a liquid and/or simultaneously adsorbing dissolved components from the liquid by means of the membrane according to the invention, characterized in that the adsorbed originally dissolved components are periodically removed by regeneration of the membrane.

The liquids to be filtered are preferably subjected to so-called longitudinal flow filtration, whereby the liquid to be filtered is led along the membrane.

Particularly good results are obtained using asymmetrical membranes according to the invention, whereby the liquid is led along an asymmetric membrane having a pore structure such that the pores at the membrane's feed side are larger than the nominal pore size and the pores of nominal pore size occur in the section toward the permeation side, the separated, undissolved components are then flushed back from the membrane and are subsequently carried away with the feed liquid.

Liquids which are especially well suited for filtration by means of the present method are beer, wine, fruit juice, bacterial suspensions, blood, milk, enzyme suspensions, etc. The present method gives particularly good results when applied in the treatment of crude beer.

The membrane of the invention is especially effective when the flushing back of the membrane takes place intermittently with a frequency of 1 sec.–10 min. for 0.1–1 sec. at a back pressure of 0.5–5 bar.

When subjecting a liquid to longitudinal flow filtration, a longitudinal flow velocity of less than 2 m/sec. is preferred.

Normally a pressure difference over the membrane of less than 0.5 bar suffices.

The membranes of the invention should be regenerated from time to time. This is done by means of a suitable regeneration solution such as, for instance a 0.5–2% NaOH solution at 50°–90° C.

The method according to the invention is pre-eminently suited for the filtration and selective separation of components from the filtered liquid which later either cause problems with the preparation of beer, or which are of great economic importance in, for example the preparation of pharmacologically active substances which are adsorbed by adsorbents and are released again during regeneration of the membrane.

The invention will now be elucidated by means of the following non-limitative examples.

EXAMPLE I

Preparation of a membrane having more than 50% active adsorbent per dry material content.

A polymer solution/suspension was prepared from 13.4% polyether sulphone (Ultrason E 3000 from BASF) and 13.4% PVPP (XL10 from ISP) and 6% PVP (ISP) in 60.3% NMP and 6.9% glycerol was spun into a hollow fibre and treated as described in U.S. Pat. No. 4,798,847. In this way a hydrophilic hollow fibre was obtained of a pore size of 1 micrometer, whereby the particles of the active adsorbent are incorporated and immobilized in the matrix.

EXAMPLE II

Membranes from Example I were brought into a filtration module having a surface area of 172 cm². Unfiltered Pilsner beer, non-stabilized and containing yeast (Bavaria, Lieshout) was filtered at an average pressure of 0.6 bar. The flux was on average 100 l/m²/h. Filtration took place up to a thickening of 2.9 (5.2 liter on a total of 8 liter). The temperature was 0° C. The following results were obtained:

|  | Plato | EBC | Tannoide | Ortho cyanogen | Poly phenol |
| --- | --- | --- | --- | --- | --- |
| Starting beer | 12.14 |  | 32 | 0.490 | 209 |
| Start of filtration | 12.01 | 0.48 | 0 | 0.184 | 90 |
| End of filtration | 12.11 | 0.48 | 0 | 0.282 | 134 |

This experiment shows that it is possible to filter and stabilize beer in one step.

In view of the fact that the fibres contained about 1.72 g PVPP and that this means that normally 3.44 liter can be filtered, these are excellent results (figures recommendation ISP Polyclar R).

The fact that the EBC is good shows also that the adsorbent is excellently immobilized and that there is no loss.

What is claimed is:

1. A microfiltration and/or ultrafiltration membrane including a polymer forming a matrix and having nominal pores of 0.001–10 µm, wherein the matrix of the membrane incorporates polyvinyl polypyrrolidonee as an active adsorbent.

2. The membrane according to claim 1, wherein the polyvinyl polypyrrolidonee is present in the membrane in an amount of 5–90% by weight.

3. The membrane according to claim 2, wherein the polyvinyl polypyrrolidone is present in the membrane in an amount of 30–70% by weight.

4. The membrane according to claim 1, wherein the membrane matrix is hydrophilic.

5. The membrane according to claim 1, wherein the membrane is asymmetric.

6. The membrane according to claim 1, wherein the membrane is constructed of different layers.

7. The membrane according to claim 1, wherein the nominal pore size of the membrane is 0.05–5 µm.

8. The membrane according to claim 7, wherein the nominal pore size of the membrane is 0.2–1.0 µm.

9. The membrane according to claim 1, wherein the membrane is tubular, flat or capillary.

10. A method of preparing a membrane comprising
preparing a polymer solution/suspension by mixing together
polysulphone or polyether sulphone,
Polyvinyl Pyrrolidone, and
a suitable solvent mixture in which the active adsorbent polyvinyl polypyrrolidonee is suspended; and
processing the polymer solution/suspension into a membrane.

11. The method according to claim 10, wherein the polymer solution/suspension comprising 5–20 parts by weight of polyether sulphone, 1–10 parts by weight of polyvinyl pyrrolidone, 5–30 parts by weight of polyvinyl polypyrrolidone, and 0–15 parts by weight of glycerine in N-methyl-pyrrolidone.

12. A method of filtering undissolved components or adsorbing dissolved components from a liquid comprising contacting the liquid with a membrane including a polymer forming a matrix and having a nominal pores of from 0.001–10 µm, wherein the matrix of the membrane incorporates polyvinyl polypyrrolidone as an active adsorbent, wherein the undissolved or dissolved components are periodically remove by regeneration of the membrane.

13. The method according to claim 12, wherein longitudinal flow filtration is applied.

14. A method of removal of components causing turbidity from a liquid by means of a membrane including a polymer forming a matrix having nominal pore of from 0,001–10 µm, wherein the matrix of the membrane incorporates polyvinyl polypyrrolidone as an active adsorbent, said membrane is an asymmetric membrane having a pore structure such that the pores at the membrane's feed side are larger than the nominal pore size, and the pores of nominal pore size occur in the section toward the permeation side, comprising contacting the liquid with said membrane, separating undissolved components by said membrane, and flushing back the membrane to carry away undissolved components.

15. The method according to claims 12 or 14, wherein the liquid is beer, wine, fruit juice, bacterial suspension, blood, milk, or an enzyme suspension.

16. The method according to claims 12, 13 or 14, wherein the liquid is crude beer.

17. The method according to claim 16, wherein the regeneration fluid is a 0.5 to 2% NAOH solution at 50°–90° C.

18. The method according to claim 14, wherein backflushing of the membrane takes place intermittently with a frequency of 1 zed.–10 min. for 0.1–1 sec. at a back pressure of 0.5–5 bar.

19. The method according to claim 18, wherein the longitudinal flow velocity is less than 2 m/sec.

20. The method according to claims 12 or 14, wherein the pressure difference over the membrane is less than 0.5 bar.

* * * * *